US011989797B2

(12) United States Patent
Bao et al.

(10) Patent No.: US 11,989,797 B2
(45) Date of Patent: May 21, 2024

(54) CLOUD-CLIENT RENDERING METHOD BASED ON ADAPTIVE VIRTUALIZED RENDERING PIPELINE

(71) Applicant: ZHEJIANG UNIVERSITY, Hangzhou (CN)

(72) Inventors: Hujun Bao, Hangzhou (CN); Rui Wang, Hangzhou (CN); Weiju Lan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 319 days.

(21) Appl. No.: 17/627,677

(22) PCT Filed: Jan. 6, 2021

(86) PCT No.: PCT/CN2021/070527
§ 371 (c)(1),
(2) Date: Jan. 16, 2022

(87) PCT Pub. No.: WO2021/179780
PCT Pub. Date: Sep. 16, 2021

(65) Prior Publication Data
US 2022/0261946 A1    Aug. 18, 2022

(30) Foreign Application Priority Data

Mar. 11, 2020    (CN) .......................... 202010166658.5

(51) Int. Cl.
*G06T 1/20* (2006.01)
*H04L 67/10* (2022.01)
(52) U.S. Cl.
CPC ................ *G06T 1/20* (2013.01); *H04L 67/10* (2013.01)

(58) Field of Classification Search
CPC ........ G06T 1/20; G06T 11/001; G06T 11/206; G06T 11/00; G06T 11/20; H04L 67/10
See application file for complete search history.

(56) References Cited

U.S. PATENT DOCUMENTS

| 2016/0059125 A1* | 3/2016 | Georgiev ................ H04L 69/14 463/31 |
| 2019/0342555 A1* | 11/2019 | Dimitrov ............... G06F 9/4856 |
| 2021/0274235 A1* | 9/2021 | Anderegg .......... H04N 21/6581 |

FOREIGN PATENT DOCUMENTS

| CN | 109933735 | 6/2019 |
| CN | 110020367 | 7/2019 |
| CN | 110751712 | 2/2020 |

OTHER PUBLICATIONS

Zhang, Zikai, Task Offloaduing Based on Mobile Cloud Computing, China Master's Theses Full-Text Database, Information Science & Technology, Jan. 15, 2019.

* cited by examiner

*Primary Examiner* — Tonia L Dollinger
*Assistant Examiner* — Mehulkumar J Shah
(74) *Attorney, Agent, or Firm* — Jiwen Chen; Joywin IP Law PLLC

(57) ABSTRACT

The present invention discloses a cloud-client rendering computing method based on an adaptive virtualized rendering pipeline, comprising the following steps of: defining a rendering pipeline, including defining a rendering resource, a rendering algorithm, and a read-write relationship between the rendering algorithm and the rendering resource; selecting an optimal cloud-client computing distribution solution in a real-time manner from a cloud-client computing distribution solution set comprising each rendering resource that is allocated to a cloud or client for computing, based on self-defined optimization objectives and an optimization (Continued)

budget of a framework user; and executing a corresponding rendering algorithm on cloud and/or on a client according to the cloud-client computing distribution solution, thereby obtaining a rendering result. The rendering framework can adaptively select the cloud-client computing distribution solution upon cloud-client combined rendering and dynamically adjust it with a change of an optimization parameter.

10 Claims, 3 Drawing Sheets

```
[FXG1]
Key #         Value
name          An example of a drawing pipeline
[EFFECT]
Node name #                 Effect name
Prepare a render queue      load-render-queue
Compute the number of       find-instance-count
instances
PBS  coloring drawing       pbs-shading
Present a drawing result    present-color
[RESOURCE]
```

| Resource name # | Type | Build a function parameter ("-" means no presence of a parameter) |
|---|---|---|
| Render queue | render-queue | - |
| The number of instances | int | 0 |
| Map color | texture | rgba32f |

[GRAPH]
(the arrow direction of the relation represents flow direction of data, '->' represents writing-in resource and '<-' represents reading resource).

| # Node name | Port name of node | Relation | Resource name |
|---|---|---|---|
| Prepare a render queue | render-queue | -> | Render queue |
| Compute the number of instances | Instance-count | -> | The number of instances |
| PBS  coloring drawing | render-queue | <- | Render queue |
| PBS  coloring drawing | instance-count | <- | The number of instances |
| PBS  coloring drawing | color | -> | Color map |
| Present a drawing result | color | <- | Color map |

FIG. 5

CLOUD-CLIENT RENDERING METHOD BASED ON ADAPTIVE VIRTUALIZED RENDERING PIPELINE

This is a U.S. national stage application of PCT Application No. PCT/CN2021/070527 under 35 U.S.C. 371, filed Jan. 6, 2021 in Chinese, claiming priority to Chinese Patent Applications No. 202010166658.5, filed Mar. 11, 2020, all of which are hereby incorporated by reference.

FIELD OF TECHNOLOGY

The present invention belongs to the real-time rendering field and in particular, relates to a rendering framework based on an adaptive virtualized rendering pipeline.

BACKGROUND TECHNOLOGY

With the popularity of mobile devices and improvement of their computing ability, the requirements for real-time rendering of a realistic image on a mobile device also increase gradually. However, compared with PC, the computing ability of the mobile device is still insufficient to support a complicated algorithm for realistic rendering. One method to solve this problem is to use a powerful computing ability on cloud. For example, CN1856819B titled with "System and Method for Network Transmission of Graphical Data Through a Distributed Application" proposes a method for finishing a rendering operation on a server with a strong computing ability and then transmitting the result to a client after being compressed. However, how to ensure high image quality while maintaining a low latency and a high frame rate on a client will be a great challenge for the method. CN101971625B titled with "System and Method for Compressing Streaming Interactive Video" states importance of a low latency in a large number of texts. For example, "100 ms of latency may be tolerable for a slow casual game or a slow-action role playing game, but in a fast action game a latency in excess of 70 or 80 ms may cause the users to perform more poorly in the game, and thus is unacceptable". The patent thus proposes a method for streaming transmission (a video string stream) improved based on a conventional video code, attempting to solve this problem. Due to popularity of a virtual-reality helmet in the recent years, people require a lower latency to reduce a dizzy sense caused by untimely feedback of a screen. Therefore, it is pointed out in work that fast response can be realized through prediction by re-projecting the screen on the client. However, all these are established at the precondition of "what is transmitted on a network is a final result of rendering". Actually, a current graphical program is equipped with a complicated rendering pipeline, a plurality of middle results of which can also be transmitted through a network. Therefore, in addition to a part of the rendering pipeline to be executed on cloud, a part of the rendering pipeline is also to be executed on the client. In this way, the computing ability on the client is also used. Therefore, selecting different middle results which are placed on cloud for computing can obtain various different cloud-client combined rendering solutions. The U.S. Pat. No. 6,384,821B1 titled with "Method and Apparatus for Delivering 3D Graphics in a Networked Environment Using Transparent Video" further proposes a solution of rendering a part of an object on a server and rendering a part of an object on a client, and finally compositing a rendering result on the server with a rendering result on the client to obtain a final result.

However, no matter which solution is selected, the selection is made by developing staff in advance based on some options. Due to dynamic features of rendering an interactive graphic, a solution for real-time adjustment of selection is generally required in a process of executing the program. The general practice is to design a plurality of superior solutions by technicians in advance. Upon running the program, the plurality of solutions are selected and switched according to a particular ad hoc selection method designed by technicians. How to design these superior solutions and how to select a solution thereof has become a problem that needs to be solved.

SUMMARY OF THE INVENTION

The object of the present invention is to provide a rendering framework based on an adaptive virtualized rendering pipeline, wherein the rendering framework can adaptively select a cloud-client computing distribution solution upon cloud-client combined rendering and dynamically adjust it with a change of an optimization parameter.

In order to realize the above object of the present invention, the technical solution of the present invention is provided as follows:

a rendering framework based on an adaptive virtualized rendering pipeline, comprising the following steps of:
defining a rendering pipeline, comprising defining a rendering resource, a rendering algorithm, and a read-write relationship between the rendering algorithm and the rendering resource, wherein the rendering resource comprises an input scene, a middle computing result, and a final screen resource;
selecting an optimal cloud-client computing distribution solution in a real-time manner from a cloud-client computing distribution solution set comprising each rendering resource that is allocated to a cloud or client for computing, based on a framework user's self-defined optimization objectives and budget of the optimization objectives; and
executing a corresponding rendering algorithm on cloud and/or on a client according to the cloud-client computing distribution solution, thereby obtaining a rendering result.

Under the framework, a user uses a rendering language provided by the framework to depict a rendering algorithm to realize different effects for different input scenes and objects, and the framework will perform overall and global automatic optimization under the precondition of considering different optimization objectives. An optimization result is then switched into a rendering process supported by a current hardware and the rendering process finally runs on a graphical hardware of the cloud or client, thereby obtaining a final result.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

FIG. 5 shows an example of a description language corresponding to the rendering pipeline of FIG. 2 in the present invention.

DESCRIPTION OF THE EMBODIMENTS

To make the objectives, technical solutions, and advantages of the present invention more comprehensible, the following describes the present invention in detail with reference to accompanying drawings and embodiments. It should be understood that the specific embodiments described herein are merely used to interpret the present invention, but not to limit the protection scope of the present invention.

Figure 1:
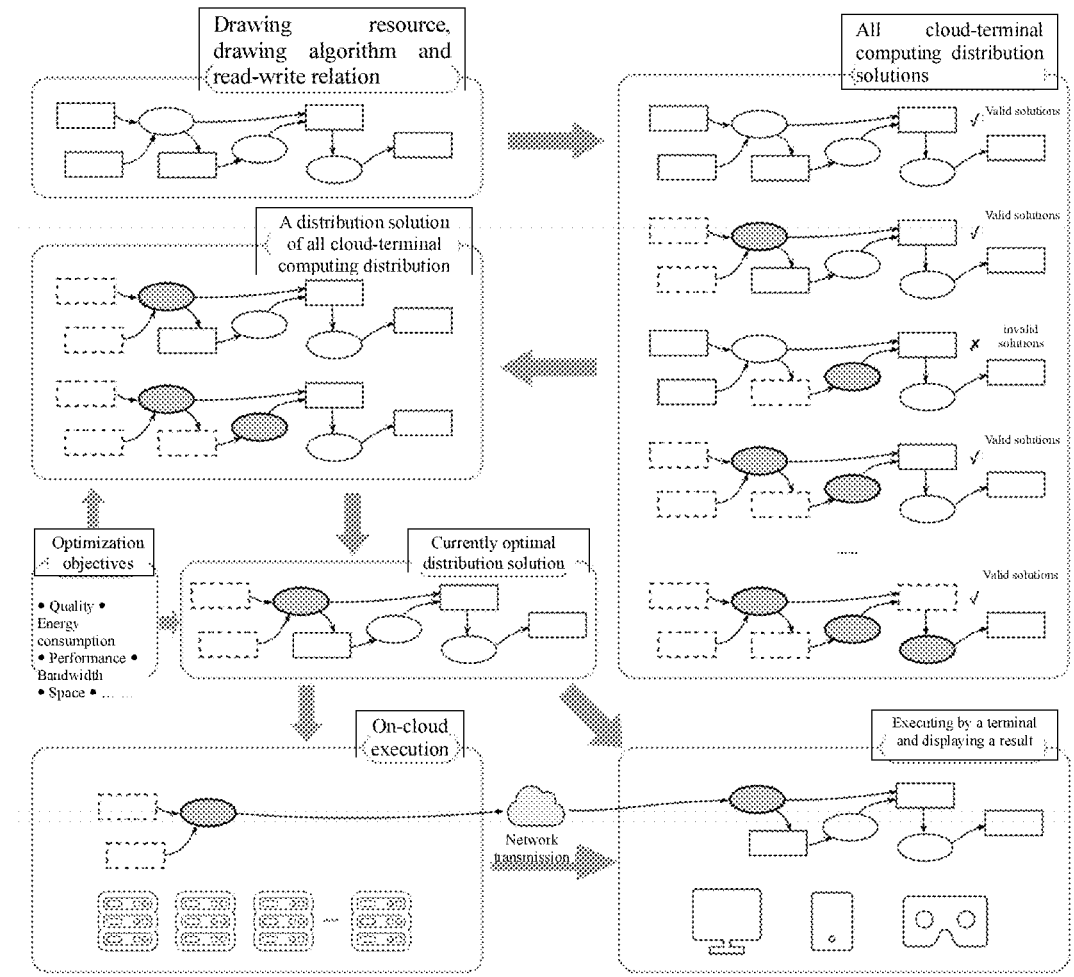
FIG. 1 shows an overall process of a rendering framework based on an adaptive virtualized rendering pipeline as provided by embodiments of the present invention.

FIG. 1 shows an overall process of a rendering framework based on an adaptive virtualized rendering pipeline as provided by embodiments of the present invention. Referring to FIG. 1, a process of a rendering framework based on an adaptive virtualized rendering pipeline as provided by embodiments of the present invention is shown as follows:

step 1 of defining a rendering pipeline with a pipeline description language explicitly represented by a resource, specifically defining a rendering resource, a rendering algorithm, and a read-write relationship between the rendering algorithm and the rendering resource, wherein the rendering resource can be divided into an input scene, a middle computing result, and a final screen resource; The input scene is a source data to be drawn. The final screen resource is a final result of rendering, which is generally displayed on a screen, for example, a color map. The middle computing result means that what is obtained by executing the rendering algorithm is not a computing result of the input scene or the final screen resource, such as the number of instances.

Figure 2:
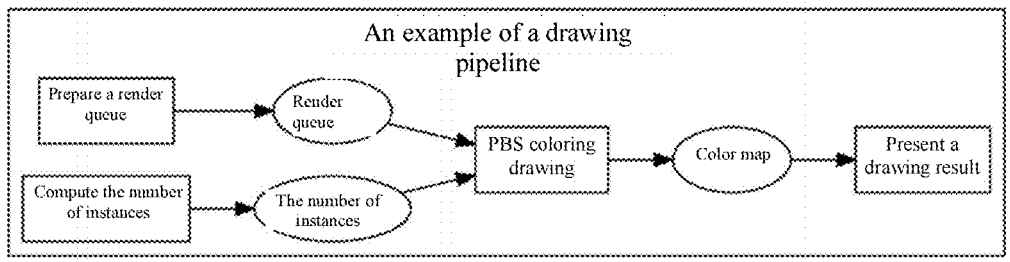
FIG. 2, FIG. 3 and FIG. 4 show examples of a set of rendering pipelines as provided by embodiments of the present invention.

A rendering pipeline shown in FIG. 2 is defined by a pipeline description language explicitly represented by a resource shown in FIG. 5, specifically defining the following contents:

(a) a rendering algorithm ([EFFECT]): preparing a render queue, computing the number of instances, performing PBS (physically based shading) coloring rendering and presenting a rendering result;

(b) a rendering resource ([RESOURCE]): an input scene render queue, a middle computing result of the number of instances, and a final screen color map; and (c) a relationship between the rendering algorithm and the rendering resource ([GRAPH]): the rendering algorithm can read data from the rendering resource and can also write data into the rendering resource. For example, the rendering algorithm computes the number of instances and writes a computing result in the number of instances of the rendering resource. However, the PBS coloring rendering of the rendering algorithm reads data from the number of instances of the rendering resource.

step 2 of selecting an optimal cloud-client computing distribution solution in a real-time manner from a cloud-client computing distribution solution set comprising each rendering resource that is allocated to a cloud or client for computing based on a framework user's self-defined optimization objectives and budget of the optimization objectives.

The framework user refers to a programmer/engineer for actual application of the method/thought to software. The framework user is not intended to select/combine a desired optimization from a plurality of pre-set optimization objectives. However, it is necessary to design a desired optimization objective and provide a quantitative objective and an optimization direction to the framework. The framework user can define the optimization objectives according to screen quality, the client's computing ability (that is the running frame rate of the client) and the network transmission bandwidth. For example, numbers 0-1 represent screen quality, with 0 representing high quality and 1 representing low quality, and real number between 0 and 1 representing screen deterioration degree, indicating that the smaller the number is, the better the screen quality is. For example again, a network transmission latency is generally a network transmission latency in the general meaning and its value ranges from 0 to infinity. The smaller the number is, the better the network transmission latency is. For example again, the client's computing ability can be represented by FPS (frames per second). 0 represents an extremely weak computing ability. The bigger the number is, the stronger the computing ability is, and the bigger the number is, the stronger the computing ability is. Obviously, the optimization direction of the client's running frame rate is: the bigger the number is, the better the running frame rate is, and the optimization direction of the network transmission latency is: the smaller the number is, the better the network transmission latency is.

The framework user also needs to define budget of the optimization objectives, that is, a threshold that the optimization objectives desire to satisfy. Budget of one optimization objective can be set only or budget of a plurality of optimization objectives can be set or budget of a series of optimization objectives like screen quality, the client's running frame rate, the client's internal memory consumption and network transmission latency can also be considered according to priorities in order. When there are a plurality of cloud-client computing distribution solutions satisfying all budgets or there is not a cloud-client computing distribution solution satisfying all budgets, the priorities will affect selection of the optimal solution. In addition, the defined budget can change at any time in an actual optimization process.

After determining the optimization objectives and budget, an optimal cloud-client computing distribution solution can be selected in a real-time manner from a cloud-client computing distribution solution comprising each rendering resource that is allocated to a cloud or client for computing based on the optimization objectives, which specifically comprises:

(a) enumeratively selecting whether to perform on-cloud computing for each rendering resource represented by a rendering pipeline, wherein a distribution of whether all rendering resources are computed on cloud forms a cloud-client computing distribution solution, thereby composing a cloud-client computing distribution solution set;

(b) removing an invalid cloud-client computing distribution solution from the cloud-client computing distribution solution set according to a read-write relationship between the rendering algorithm and the rendering resource;

(c) selecting all configurations satisfying Pareto Optimality according to the optimization objectives from a remaining cloud-client computing distribution solution, thereby obtaining a series of superior cloud-client computing distribution solutions; and (d) upon operation, selecting one optimal cloud-client computing distribution solution from the series of superior cloud-client distribution solutions according to a budget of the optimization objectives.

In embodiments, the cloud-client computing distribution solution is generated through an enumerating manner. Each cloud-client computing distribution solution comprises distribution of all rendering resources of one rendering pipeline. If the rendering pipeline comprises n rendering resources, $2^n$ cloud-client computing distribution solutions are formed in total after enumeration and each cloud-client computing distribution solution comprises distribution of n rendering resources.

Figure 3:
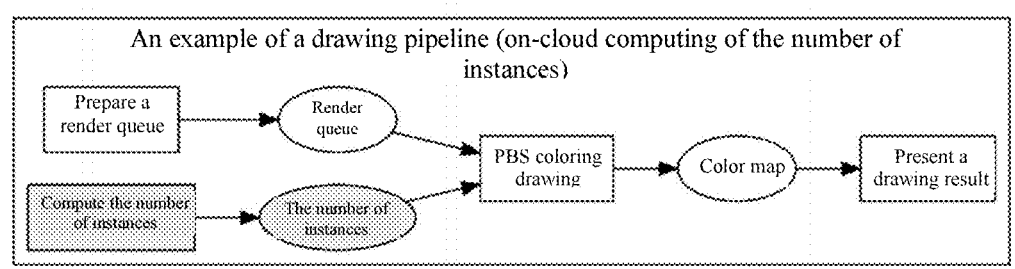
Figure 4:
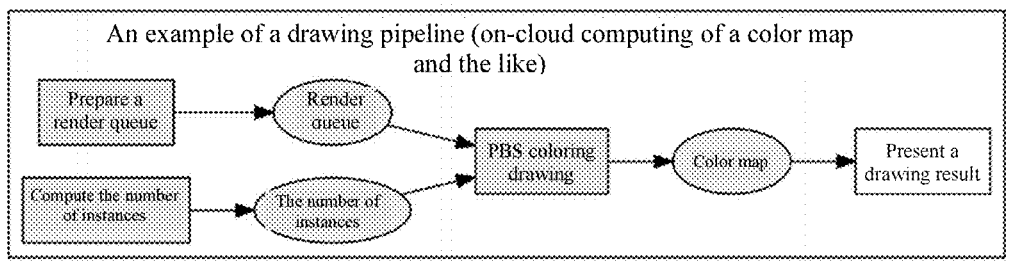

For convenient statement, FIGS. 2-4 illustratively list three cloud-client computing distribution solutions. The rectangle of the rendering represents a rendering algorithm, the ellipse represents a rendering resource, and a gray background represents that the rendering algorithm or the rendering resource is computed on cloud. The cloud-client computing distribution solution shown in FIG. 2 comprises a render queue, the number of instances and all rendering resources of a color map totally computed on the client. In the cloud-client computing distribution solution shown in FIG. 3, the number of instances of the rendering resource is computed on cloud and the render queue and the color map of the remaining rendering resource are computed on the client. Therefore, the rendering algorithm for computing the number of instances is allocated to cloud for execution. In the cloud-client computing distribution solution shown in FIG. 4, the color map, the render queue and the number of instances of the rendering resource are allocated on cloud for computing. Therefore, the rendering algorithm prepares the render queue, computes the number of instances and allocates PBS coloring rendering to cloud for execution.

Since the on-cloud rendering resource can be provided to the client for use, the rendering resource of the client cannot be provided to cloud for use. Therefore, in the cloud-client computing distribution solution generated through enumeration purely, some invalid cloud-client computing distribution solutions exist, so that it is necessary to additionally remove these invalid cloud-client computing distribution solutions. Specifically, according to the read-write relationship between the rendering algorithm and the rendering resource, it is judged whether any one rendering algorithm exists and whether it writes the rendering resource computed on any one cloud. However, it also reads the rendering resource computed on any one client. If existing, the cloud-client computing distribution solution is invalid, in which case it is necessary to remove it from the cloud-client computing distribution solution.

The following illustratively gives selecting all configurations satisfying Pareto Optimality based on the client's running frame rate and the network transmission latency defined as an optimization objective from a remaining cloud-client computing distribution solution after removing the invalid solution, thereby obtaining a series of superior cloud-client computing distribution solutions.

It is assumed that on a general client and in a general network environment, the client's running frame rate of the rendering pipeline as shown in FIG. 2 is able to reach 10 FPS, and the network transmission latency is 0 ms. The client's running frame rate of the rendering pipeline as shown in FIG. 3 is able to reach 30 FPS and the network transmission latency is 10 ms. The client's running frame rate of the rendering pipeline as shown in FIG. 4 is able to reach 60 FPS and the network transmission latency is 200 ms. It is assumed that the framework user will set budget of the client's running frame rate to be 40 FPS, the budget of the network transmission latency is set to 300 ms and the network transmission latency is optimized in priority.

On a general client and in a general network environment, the rendering pipeline shown in FIG. 4 only satisfies all budgets. Therefore, it will be selected as the optimal cloud-client computing distribution solution at present. When the network environment deteriorates, the network transmission latency of the rendering pipeline as shown in FIG. 4 reaches 500 ms and the network transmission latency of the rendering pipeline as shown in FIG. 3 reaches 100 ms, in which case there is not a cloud-client computing distribution solution any longer that satisfies all budgets. At this time, the rendering pipelines of FIG. 2 and FIG. 3 can satisfy the budget of the network transmission latency. However, they cannot satisfy computing of the client's executing frame rate. Therefore, the rendering pipeline of FIG. 3 with the optimal executing frame rate of the client as the currently optimal cloud-client computing distribution solution.

On a client with a strong computing ability and in a general network environment, the client's running frame rate of the rendering pipeline as shown in FIG. 2 reaches 50 FPS, the client's running frame rate of the rendering pipeline of FIG. 3 reaches 100 FPS, and the client's running frame rate of the rendering pipeline of FIG. 4 reaches 200 FPS. The rendering pipelines of FIGS. 2-4 satisfy all budgets and the framework user is set to optimize the network transmission latency in priority. Therefore, FIG. 2 will be selected as an optimal cloud-client computing distribution solution.

Step S103 of executing a corresponding rendering algorithm on cloud and/or on a client according to the cloud-client computing distribution solution, thereby obtaining a rendering result.

When all rendering resources in the cloud-client computing distribution solution are executed on a client, for the rendering pipeline shown in FIG. 2, the client executes a corresponding rendering algorithm according to a defined rendering pipeline to obtain a rendering result.

When a part of all rendering resources in the cloud-client computing distribution solution is executed on cloud and the remaining is executed on a client, a corresponding rendering algorithm is executed on cloud according to a defined rendering pipeline to obtain a computing result and the computing result is transmitted to the client, wherein the client executes a corresponding rendering algorithm according to the received computing result to obtain a rendering result. For the rendering pipeline as shown in FIG. 3, the number of instances is computed by executing the rendering algorithm on cloud and the number of instances of the rendering resource as the computing result is output to the client. According to the rendering pipeline, the client executes the rendering algorithm, prepares a render queue to obtain the render queue and call the render queue according to the number of instances to perform PBS coloring rendering to obtain a color map and executes the rendering algorithm according to the color map to present and obtain a rendering result.

When all rendering resources in the cloud-client computing distribution solution are executed on cloud, a corresponding rendering algorithm is executed on cloud according to a defined rendering pipeline to obtain a final display resource, wherein the client directly displays the received final display resource. For the rendering pipeline as shown in FIG. 4, the cloud will finally display the computing result on a resource color map for transmission to the client, and the client directly executes the rendering algorithm to present the rendering result for displaying the color map.

On the basis of the above S101 to S103, the rendering framework further comprises:

monitoring a change of the optimization objectives in a real-time manner, dynamically updating the optimization objectives according to the change of the optimization objectives and updating a currently optimal cloud-client computing distribution solution according to the updated optimization objectives.

Specifically, a network transmission bandwidth can be monitored in a real-time manner, an optimization objective is dynamically updated when a network transmission latency increases, and a currently optimal cloud-client computing distribution solution is updated according to the updated optimization objective.

For example, when the rendering pipeline as shown in FIG. 4 is being currently executed, upon monitoring increase of the network transmission latency, the current rendering pipeline is switched to the rendering pipeline as shown in FIG. 3 to satisfy all budgets in a best-effort manner.

In the foregoing specific implementations, technical solutions, and advantageous benefits of the present invention are described in detail. It should be understood that the foregoing descriptions are merely preferable embodiments of the present invention, but are not intended to limit the present invention. Any modification, supplement and equivalent replacement made within the principle of the present invention shall fall within the protection scope of the present invention.

What is claimed is:

1. A cloud-client rendering computing method based on an adaptive virtualized rendering pipeline, comprising the following steps of:

defining a rendering pipeline with an explicit representation manner for a resource, comprising defining a rendering resource, a rendering algorithm, and a read-write relationship between the rendering algorithm and the rendering resource, wherein the rendering resource comprises an input scene, a middle computing result, and a final screen resource, and each rendering pipeline comprises at least one set of a plurality of rendering algorithms jointly acting on one same rendering resource;

selecting an optimal cloud-client computing distribution solution in a real-time manner from a cloud-client computing distribution solution set comprising each rendering resource that is allocated to a cloud or client for computing, based on a framework user's six self-defined optimization objectives comprised of quality, energy consumption, performance, delay, bandwidth and space, and budget of the optimization objectives; and executing a corresponding rendering algorithm on cloud and/or on a client according to the cloud-client computing distribution solution, thereby obtaining a rendering result;

wherein the selecting an optimal cloud-client computing distribution solution in a real-time manner from a cloud-client computing distribution solution set comprising each rendering resource that is allocated to a cloud or client for computing comprises: enumeratively selecting whether to perform on-cloud computing for each rendering resource represented by a rendering pipeline, wherein a distribution of whether all rendering resources are computed on cloud forms a cloud-client computing distribution solution, thereby composing a cloud-client computing distribution solution set; removing an invalid cloud-client computing distribution solution from the cloud-client computing distribution solution set according to a read-write relationship between the rendering algorithm and the rendering resource; selecting all configurations satisfying Pareto Optimality according to the optimization objectives from a remaining cloud-client computing distribution solution, thereby obtaining a series of superior cloud-client computing distribution solutions; and upon operation, selecting one optimal cloud-client computing distribution solution from the series of superior cloud-client distribution solutions according to an operation budget.

2. The cloud-client rendering computing method based on an adaptive virtualized rendering pipeline as claimed in claim 1, wherein when all rendering resources in the cloud-client computing distribution solution are executed on a client, a corresponding rendering algorithm is executed by the client according to a defined rendering pipeline to obtain a rendering result.

3. The cloud-client rendering computing method based on an adaptive virtualized rendering pipeline as claimed in claim 1, wherein when a part of all rendering resources in the cloud-client computing distribution solution is executed on cloud and the remaining is executed on a client, a corresponding rendering algorithm is executed on cloud according to a defined rendering pipeline to obtain a computing result, and then the computing result is transmitted to the client, wherein the client executes a corresponding rendering algorithm according to the received computing result to obtain a rendering result.

4. The cloud-client rendering computing method based on an adaptive virtualized rendering pipeline as claimed in claim 1, wherein when all rendering resources in the cloud-client computing distribution solution are executed on cloud, a corresponding rendering algorithm is executed on cloud according to a defined rendering pipeline to obtain a final display resource, wherein the client directly displays the received final display resource.

5. The cloud-client rendering computing method based on an adaptive virtualized rendering pipeline as claimed in claim 3, wherein the computing result obtained by the corresponding rendering algorithm executed on cloud is transmitted to the client after being compressed with a compression technique.

6. The cloud-client rendering computing method based on an adaptive virtualized rendering pipeline as claimed in claim 1, wherein the rendering computing method further comprises: monitoring a change of the optimization objectives in a real-time manner, dynamically updating the optimization objectives according to the change of the optimization objectives and updating a currently optimal cloud-client computing distribution solution according to the updated optimization objectives.

7. The cloud-client rendering computing method based on an adaptive virtualized rendering pipeline as claimed in claim 5, wherein the rendering computing method further comprises: monitoring a change of the optimization objectives in a real-time manner, dynamically updating the optimization objectives according to the change of the optimization objectives and updating a currently optimal cloud-client computing distribution solution according to the updated optimization objectives.

8. The cloud-client rendering computing method based on an adaptive virtualized rendering pipeline as claimed in claim 6, wherein a network transmission bandwidth is monitored in a real-time manner, the optimization objectives are dynamically updated when a network transmission delay increases, and a currently optimal cloud-client computing distribution solution is updated according to the updated optimization objectives.

9. The cloud-client rendering computing method based on an adaptive virtualized rendering pipeline as claimed in claim 7, wherein a network transmission bandwidth is monitored in a real-time manner, the optimization objectives are dynamically updated when a network transmission delay increases, and a currently optimal cloud-client computing distribution solution is updated according to the updated optimization objectives.

10. The cloud-client rendering computing method based on an adaptive virtualized rendering pipeline as claimed in claim 4, wherein the computing result obtained by the corresponding rendering algorithm executed on cloud is transmitted to the client after being compressed with a compression technique.

\* \* \* \* \*